No. 618,721. Patented Jan. 31, 1899.
J. S. PATTEN.
AXLE BOX.
(Application filed Mar. 22, 1898.)
(No Model.)
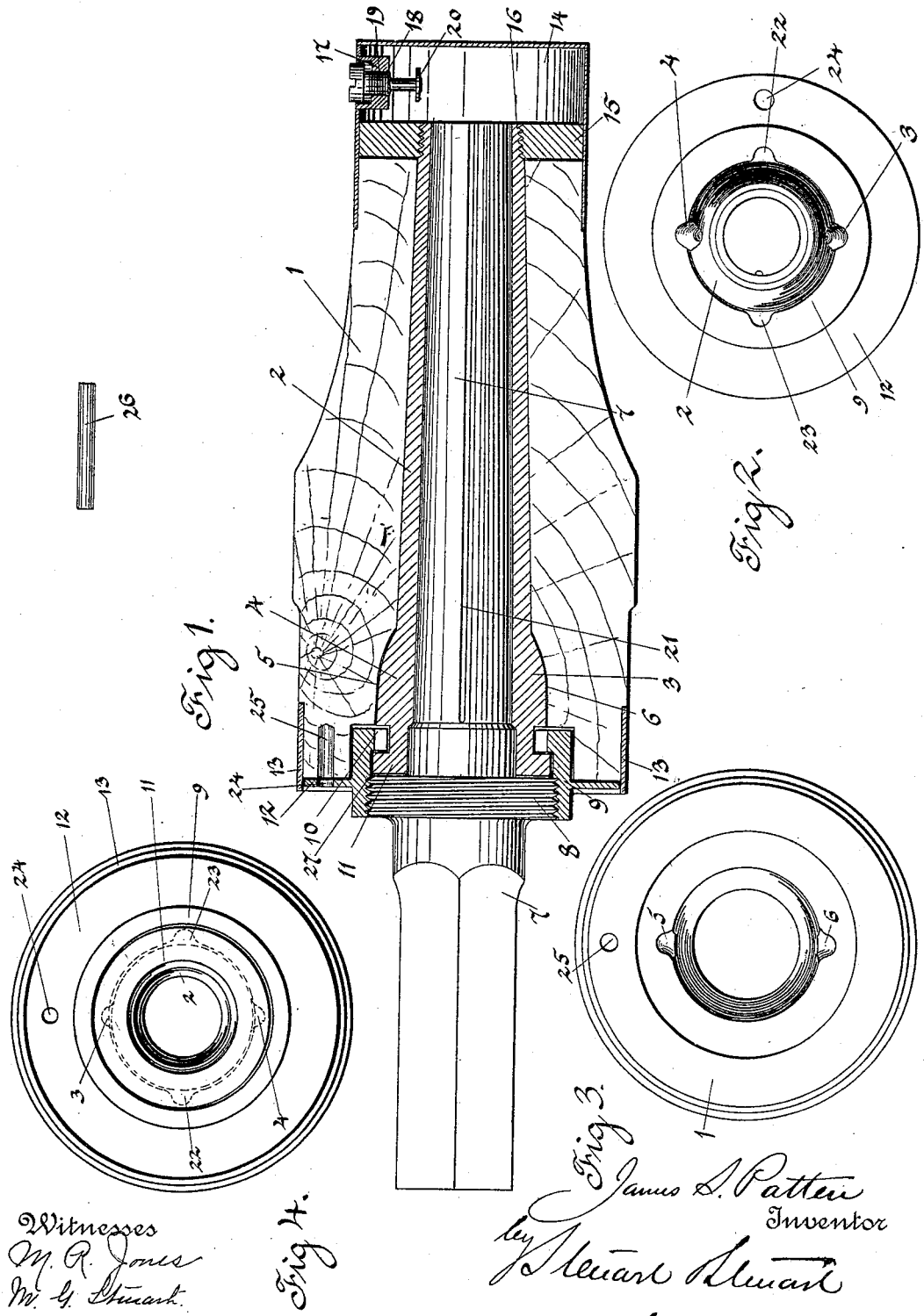
Witnesses
M. R. Jones
M. G. Stuart
James S. Patten
Inventor
by Stuart Stuart
his Attorneys

UNITED STATES PATENT OFFICE.

JAMES S. PATTEN, OF BALTIMORE, MARYLAND.

AXLE-BOX.

SPECIFICATION forming part of Letters Patent No. 618,721, dated January 31, 1899.

Application filed March 22, 1898. Serial No. 674,741. (No model.)

*To all whom it may concern:*

Be it known that I, JAMES S. PATTEN, a citizen of the United States of America, and a resident of Baltimore, Maryland, have invented certain new and useful Improvements in Axle-Boxes, of which the following is a specification.

My invention relates to a dust-proof axle-box for carriages, in combination with an automatic oiler.

The object of my invention is to provide an axle-box which is so constructed as to be practically dust-proof and to permit the lubrication of this box automatically from a fountain by the use of a thin high-grade lubricating-oil in preference to a grease.

Heretofore it has been customary to make axle-boxes in the crudest fashion, using simply a spindle, a box, and a nut on the end of the spindle, and in consequence of the exposure of the bearing to the entrance of dust and the fact that its extremities were open to use a low grade of lubricant in the form of a paste or gum, so that the lubricant would not only stop up the openings to some extent against the entrance of dust, but at the same time maintain the bearing to some extent lubricated and which would not flow away in ordinary use. My invention makes it possible to exclude dust and at the same time to lubricate a bearing freely for an indefinite length of time with a high-grade lubricant at a very low cost.

In the drawings which accompany this application similar numerals of reference are used to indicate the same parts on the various figures.

Figure 1 is a vertical longitudinal section of my axle-box, showing the hub, axle-box, and adjacent parts in section and the axle and spindle in full elevation. Fig. 2 is an outer end view of the spindle and axle-box and nut, the hub and oiling-cup being removed. Fig. 3 is an inner end view of the wooden portion of the hub, showing its recesses with all other parts removed. Fig. 4 is an inner end view of the hub, showing the axle-box within the hub and the nut upon the inner end of the hub.

Referring to the drawings, 1 is the ordinary hub of a wheel.

2 is the ordinary axle-box modified to suit my purpose.

3 4 are the ordinary longitudinal lugs cast on the exterior of the axle-box and fitting into the grooves 5 and 6 in the interior of the hub for the purpose of preventing the rotation of the hub 1 upon the axle-box.

7 is the axle, having a tapered spindle which fits into the axle-box 2, which forms a bearing for the spindle. It is made in the usual form, except that it has no thread or nut upon its extremity, but is provided with a flange 8 upon the inner end of the spindle, which is threaded and upon which is screwed the nut 9. The nut 9 consists of a cup-shaped nut threaded upon its interior and perforated in the center of the cup, said perforation being of less diameter than the interior of the nut, thus leaving an inward-projecting flange 10.

11 is a circular projecting flange upon the end of the axle-box. The flange 11 is made of a size to fit loosely within the cup-shaped nut 9 and rotate therein. The inwardly-projecting flange 10 is notched at diametrically opposite points, so as to permit the axle-box having the lugs 3 4 to pass through it. The thread upon the interior of the nut 9 is cut down to a shoulder 27, so that when the nut 9 is screwed upon the flange 8 the flange 11 of the axle-box 2 will not be jammed within the nut, but will have sufficient play to turn freely therein. From the exterior of the nut 9, at about its center, projects a radial flange 12, which is of a diameter only slightly less than the hub.

13 is the ordinary inner hub-ring, secured to the inner end of the wooden hub and projecting beyond the exterior edge of the flange 12, which turns freely within it. The hub 1 is recessed at its rear end in such a manner as to permit the nut 9 to enter the recess surrounding the axle-box and turn freely therein without touching the hub.

14 is the oil-cap. It consists of a cap formed of the usual outer hub-ring with the end closed.

15 is a ring having an aperture in its center and threaded at 16 upon the end of the axle-box 2. This ring is of a size to fit tightly within the cap 14 and is secured thereto.

17 is an inwardly-projecting lug secured to the inside of the cap 14 and perforated through its center with a hole 18.

19 is a screw closing the hole 18, and 20 is a washer on the extremity of said screw 19 to prevent its falling out of the hole in case it should become loose. The screw is made short, having a small spindle beyond the threaded portion of the screw, so that when the screw is unscrewed to the limit of the thread it may be withdrawn and still leave an aperture through which oil may be injected into the oil-cup 14.

21 is an oil-channel grooved into the spindle of the axle and communicating at its outer end with the oil-cup 14.

Referring to Fig. 2, the notches in the flange 10, through which the lugs 4 and 5 are permitted to pass, are numbered 22 and 23. 24 is a hole in the flange 12, which registers with a hole 25 in the hub. 26 is a pin which may be passed through a hole 24 and into the hole 25, so as to lock the nut 9 and the hub 1 together.

In assembling the device the axle-box is first inserted through the nut 9, the lugs 3 and 4 passing through the notches 22 and 23. The axle-box and nut 9 are then inserted within the hub 1. The threaded end of the axle-box will project beyond the outer end of the hub, and the cup 14, which is the oil-reservoir, may be screwed upon the end of the axle-box. The pin 26 is then inserted through the hole 24 in the flange 12 and into the hole 25 of the hub, and the nut 9 may then be screwed upon the flange 8 by simply turning the wheel upon the spindle until the nut 9 is firmly seated upon the shoulder 27. When this is accomplished, the pin 26 may be withdrawn, and the axle-box will still turn freely within the nut 9. It will be noticed from the drawings that by my construction the outer end of the hub is wholly closed and no dust can enter. The inner end of the axle-box is also closed by the interlocking of the two flanges 10 and 11 and also by the radially-projecting flange 12, which is covered by the ring 13. The bearing is thus seen to be practically dust-proof. The box is oiled by unscrewing the screw 19 and filling the reservoir within the cap 14 with a fluid oil and closing the hole 18 with the screw 19 again. The function of the inwardly-projecting lug 17 will be apparent. If the oiling-hole were in the outer wall of the cap 14 and the screw should become loose, centrifugal action would cause all of the oil to flow out of the oiling-hole; but the inwardly-projecting lug, through the center of which passes the screw-plug and through which oil is injected, projects inwardly toward the center of rotation, and as the oil is thrown out by centrifugal force as the wheel turns it will flow around this inwardly-projecting plug and not reach its opening to any considerable extent.

Having thus described my invention, what I claim, and desire to secure by Letters Patent, is—

1. In an axle-box the combination of a spindle having an integral flange upon its inner end which is threaded upon its periphery, an axle-box fitting upon the spindle and having an integral flange upon its inner end and a nut consisting of a sleeve provided with an inwardly-projecting flange at one end and threaded upon its interior at the other end through which the axle-box passes and which embraces the flange of the axle-box and is screwed upon the flange of the spindle, with an oil-reservoir consisting of a cap secured upon the end of the axle-box and having a lug upon its interior which projects radially toward the center of rotation, said lug being perforated for the admission of oil, and a screw for closing the oil-hole having a washer upon its inner end which prevents the screw from dropping out, substantially as described.

2. In an axle-box the combination of a spindle having an integral flange upon its inner end which is threaded upon its periphery, an axle-box fitting upon the spindle and having an integral flange upon its inner end and a nut consisting of a sleeve provided with an inwardly-projecting flange at one end and threaded upon its interior at the other end through which the axle-box passes and which embraces the flange of the axle-box and is screwed upon the flange of the spindle, said nut being provided on its exterior with an annular laterally-projecting flange and a hub fitting upon the axle-box and provided upon its inner end with a hub-ring which projects inwardly beyond the edge of the laterally-projecting flange of the nut, substantially as described.

3. In an axle-box the combination of a spindle having a flange upon its inner end which is threaded upon its periphery, an axle-box fitting upon the spindle and having a flange upon its inner end and longitudinal lugs upon its exterior surface, an oil-reservoir screwed upon the end of the axle-box, a nut consisting of a sleeve provided with an inwardly-projecting flange at one end and threaded upon its interior at the other end, which embraces the flange of the axle-box and is screwed upon the flange of the spindle, said nut being provided on its exterior with a flange, a wheel-hub having grooves on its interior surface into which the lugs on the box enter, thereby locking the box and the hub, and means for locking the hub and the nut so that the nut may be unscrewed by turning the wheel, all arranged and constructed substantially as described and for the purposes set forth.

Signed by me, at Baltimore city, Maryland, this 16th day of March, 1898.

JAMES S. PATTEN.

Witnesses:
GEORGE KENT,
GEO. C. MORRISON.